US012793138B2

(12) United States Patent
Noonan

(10) Patent No.: US 12,793,138 B2
(45) Date of Patent: Nov. 10, 2026

(54) METHODS, SYSTEMS AND APPARATUSES FOR CREATING, TRAINING AND RECONFIGURING A CROSSING ENGINE FOR FINANCIAL TRADING

(71) Applicant: RIALTO TRADING TECHNOLOGY, LLC, New York, NY (US)

(72) Inventor: Shari Noonan, New York, NY (US)

(73) Assignee: Rialto Trading Technology, LLC., New York, NY (US)

( * ) Notice: Subject to any disclaimer, the term of this patent is extended or adjusted under 35 U.S.C. 154(b) by 0 days.

(21) Appl. No.: 15/671,136

(22) Filed: Aug. 7, 2017

(65) Prior Publication Data

US 2018/0040068 A1 Feb. 8, 2018

Related U.S. Application Data

(60) Provisional application No. 62/371,931, filed on Aug. 8, 2016.

(51) Int. Cl.

| | |
|---|---|
| ***G06Q 40/06*** | (2012.01) |
| ***G06F 16/903*** | (2019.01) |
| ***G06N 3/006*** | (2023.01) |
| ***G06N 5/01*** | (2023.01) |
| ***G06N 7/01*** | (2023.01) |
| ***G06N 20/00*** | (2019.01) |
| ***G06Q 30/0201*** | (2023.01) |
| ***G06Q 40/04*** | (2012.01) |

(52) U.S. Cl.

CPC ....... *G06Q 40/06* (2013.01); *G06F 16/90335* (2019.01); *G06N 3/006* (2013.01); *G06N 5/01* (2023.01); *G06N 20/00* (2019.01); *G06Q 30/0201* (2013.01); *G06Q 40/04* (2013.01); *G06N 7/01* (2023.01)

(58) Field of Classification Search

CPC .... G06Q 40/06; G06Q 30/0201; G06Q 40/04; G06F 16/90335; G06N 20/00; G06N 3/006; G06N 5/003; G06N 7/005

USPC ........................................... 705/37, 35, 26.3

See application file for complete search history.

(56) References Cited

U.S. PATENT DOCUMENTS

| | | | | | |
|---|---|---|---|---|---|
| 5,845,266 | A * | 12/1998 | Lupien | G06Q 40/00 705/36 R |
| 6,012,046 | A * | 1/2000 | Lupien | G06Q 40/00 705/36 R |

(Continued)

FOREIGN PATENT DOCUMENTS

| | | | | | |
|---|---|---|---|---|---|
| EP | 1118953 | A2 * | 7/2001 | G06Q 30/06 |
| WO | WO-9634357 | A1 * | 10/1996 | G06Q 40/03 |
| WO | WO-0161549 | A2 * | 8/2001 | G06Q 10/04 |

*Primary Examiner* — Steven G.S. Sanghera

*Assistant Examiner* — Pierre L Maccagno

(74) *Attorney, Agent, or Firm* — Alston & Bird LLP

(57) ABSTRACT

The present disclosure is directed towards methods, systems and apparatuses for creating, training and reconfiguring a crossing engine that are particularly useful in trading of financial instruments such as fixed income securities. The present disclosure provides tools for generating a crossing engine given an initial situation as well as tools for adding and removing constraints, optimizations and corrections in order to re-generate the crossing engine in a way that takes into account such additional learned refinements.

20 Claims, 4 Drawing Sheets

(56) References Cited

U.S. PATENT DOCUMENTS

| | | | | |
|---|---|---|---|---|
| 6,751,597 | B1 * | 6/2004 | Brodsky | G06Q 40/00 705/37 |
| 7,398,228 | B2 * | 7/2008 | Egashira | G06Q 30/0635 705/26.8 |
| 9,424,861 | B2 | 8/2016 | Jerram et al. | |
| 2014/0081667 | A1 * | 3/2014 | Joao | G16H 40/63 705/3 |
| 2018/0040068 | A1 * | 2/2018 | Noonan | G06F 16/90335 |
| 2018/0308173 | A1 | 10/2018 | Noonan | |

* cited by examiner

| | A | | B | | C | |
|---|---|---|---|---|---|---|
| | Want | Have | Want | Have | Want | Have |
| X | - | 10 | 5 | - | - | 5 |
| Y | - | 20 | 10 | - | - | - |
| Z | 3 | 6 | - | 4 | - | 10 |
Fig. 2
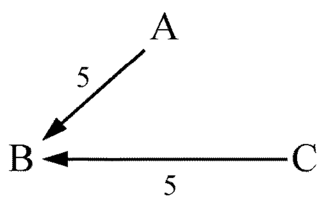
Fig. 3
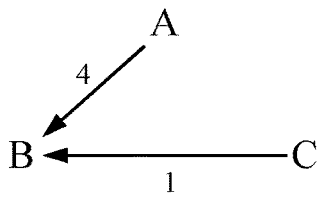
Fig. 4
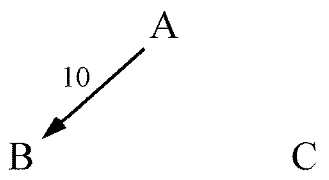
Fig. 6

| To A | | |
|---|---|---|
| *Solution No.* | **From B** | **From C** |
| *1* | 0 | 3 |
| *2* | 1 | 2 |
| *3* | 2 | 1 |

METHODS, SYSTEMS AND APPARATUSES FOR CREATING, TRAINING AND RECONFIGURING A CROSSING ENGINE FOR FINANCIAL TRADING

CROSS REFERENCE TO RELATED APPLICATION

This application claims the benefit of U.S. Provisional Application No. 62/371,931, filed Aug. 8, 2016, which is hereby incorporated by reference in its entirety.

RESERVATION OF RIGHTS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

The present innovations generally address computer software tools for interacting with and assisting traders of financial instruments to help them research and implement trades, and more particularly, include METHODS, SYSTEMS AND APPARATUSES FOR CREATING, TRAINING AND RECONFIGURING A CROSSING ENGINE FOR FINANCIAL TRADING.

In order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. §112.

Automated tools for determining whether and how counterparties will execute a trade of equities are known. For example, such existing tools are capable of knowing whether a party's bid price (price they will pay) for a share of stock is equal to or higher than another party's offer price (minimum price they will accept) for that share of stock that they hold. In such circumstances, the trade is said to "cross" and the existing tools are capable of recognizing the cross and executing the trade.

However, existing tools are limited in their capabilities and as such are often restricted to use in relatively simple applications such as facilitating the trading of equities in major exchanges. In equities markets, there are a finite, relatively small number of unique securities that are traded. Equities markets also tend to be relatively active such that liquidity is not usually an issue—meaning that buyers are able to find available securities that they want to buy and sellers are able to find buyers for securities that they hold with little difficulty. In addition, governmental and other regulation of the buying and selling of equities are fairly simple and straightforward.

In other financial markets the situation can be much different and more challenging. Liquidity may not be a given, complex internal, external and governmental rules can limit the trades that are permitted to occur, and the number of financial products available for trading can be very large and diverse. An example of such a challenging market is the market for fixed income securities, such as governmental and corporate bonds. Liquidity, strict regulation on trading and portfolio holdings and the sheer number of different unique fixed income securities present enormous obstacles that until now have thwarted the use of automated crossing tools to facilitate trading. These obstacles are compounded as the number of market participants and the size of participants' holdings or baskets of products available for trading increase.

BRIEF SUMMARY

The present inventions generally address methods, systems and apparatuses for creating, training and reconfiguring a crossing engine for financial trading.

In general, in one embodiment, a computer implemented method for generating a trained crossing engine, embodied as instructions stored in non-transitory computer memory which, when executed by a computer processor, are configured to input an initial situation specifying at least a plurality of market participants and at least one product that the market participants have or want, generate a cross graphs for each product specifying the volume of the product available to sell to the participants wanting the product from the participants having the product, generate from the cross graphs a set of permissible solutions each specifying an exact volume of product bought and sold by each participant, generate from the initial situation and the set of permissible solutions an initial crossing engine, enter the initial situation into the initial crossing engine to obtain a set of recommended trades, and verify that the set of recommended trades falls within the set of permissible solutions.

In some implementations, the initial situation specifies at least one trade constraint.

In some implementations, the initial situation specifies at least one portfolio constraint.

In some implementations, the method also includes implementing a constraint on the set of recommended trades and regenerating the crossing engine based on the constrained set of recommended trades and the initial situation.

In some implementations, the method also includes providing a positive reinforcement to the selected ones of the recommended trades in accordance with an optimization specification and regenerating the crossing engine based on the reinforced set of recommended trades and the initial situation.

In some implementations, the method also includes removing a constraint on the set of recommended trades and regenerating the crossing engine based on the less constrained set of recommended trades and the initial situation.

BRIEF DESCRIPTION OF THE DRAWINGS

The accompanying drawings illustrate various non-limiting, example, innovative aspects in accordance with the present descriptions:

FIG. 2. shows an example of a training situation according to an exemplary embodiment.

FIG. 3 shows an example of a cross graph according to an exemplary embodiment.

FIG. 4 shows an example of another cross graph according to an exemplary embodiment.

FIG. 6 shows yet another example of another cross graph according to an exemplary embodiment.

DETAILED DESCRIPTION

Figure 1:
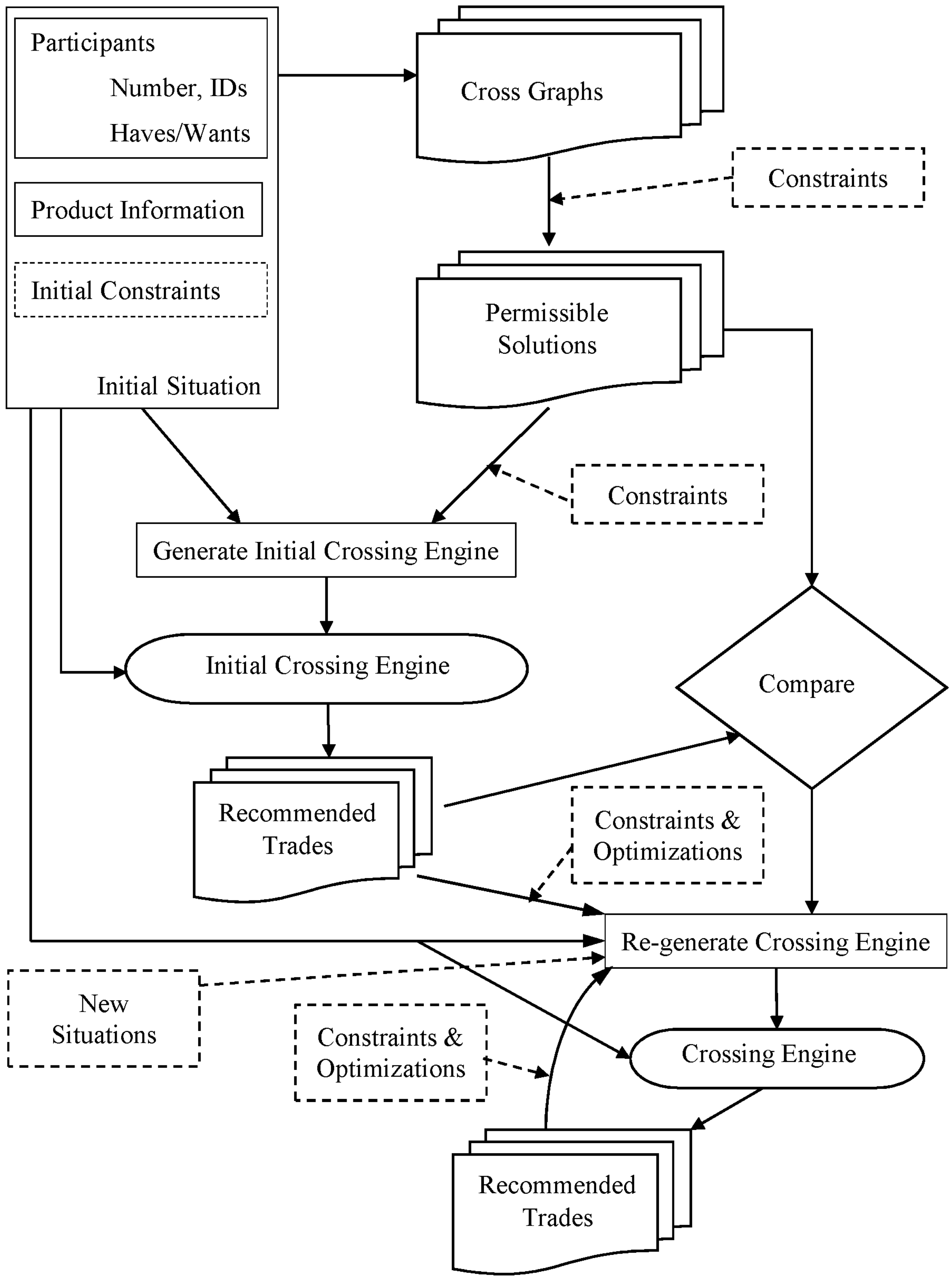
FIG. 1 shows a flowchart illustrating embodiments of a crossing engine generation and training system.

Embodiments of crossing engines, tools for creating, training and reconfiguring crossing engines as well as related methods, systems and apparatuses are described herein. While aspects of the described crossing engines, tools for creating, training and reconfiguring crossing engines and related methods, systems and apparatuses can be implemented in any number of different configurations, the embodiments are described in the context of the following exemplary configurations. The descriptions and details of well-known components and structures are omitted for simplicity of the description.

The description and figures merely illustrate exemplary embodiments of the inventive crossing engines, tools for creating, training and reconfiguring crossing engines and related methods, systems and apparatuses. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Arriving at the optimal crossing of baskets of portfolios is a potentially hard optimization problem in the general case and suffers from combinatorial explosion, particularly when attempting to exclude outliers, in the process of arriving at an optimized set of crossing trades. That is, when many different market participants want to buy and sell many different products, and many participants have portfolios of those products in varying amounts and each participant has their own preferred bid and offer prices, figuring out which participant can trade with which, for what, and at what price becomes a very difficult problem to solve as those parameters are expanded. The imposition of internal and external trading and portfolio constraints further complicates the solution.

In addition, as constraints evolve, and new constraints arise, a traditional algorithmic implementation of a crossing algorithm will need changes to its core, necessitating substantial amount of back testing. In addition, as constraints fall off, a similar algorithmic implementation will continue to have the appendage of currently irrelevant constraints.

In light of the above and several other practical issues of building a robust crossing engine, we propose a system to use machine/deep learning to infer the permissible and optimal crossing trades. We also propose a system of reinforcement learning to make the system better over time with use.

As discussed above, inferring the best result set of crossing trades given a set of large participants and large baskets can be a computationally hard problem, so the proposed reinforcement learning system may be used to achieve as best an outcome as possible with scope for improvement over time. As a part of the reinforcement learning system, or separately stored, is a carefully constructed algorithm for generating the training set of crossing baskets, which are then fed into the training harness for the crossing engine.

In addition, a set of human or hand generated training sets can be used to teach the crossing engine about corner cases. Finally, a system to complement the crossing engine with an algorithmic verification of non-violation of constraints, along with a resolution mechanism may be implemented.

The proposed crossing engine will represent the accumulated learning, so to that extent, in a client white-labeled context, it may embody the proprietary learning datasets that originate out of a client's peculiar order flow. Accordingly, the accumulated learning of one client's crossing engine may be different than that of a different client. In this way, differently configured crossing engines may be created using the same basic methods and tools for different clients.

An exemplary embodiment of the present system is depicted generally in FIG. 1. At the outset, a crossing engine may be generated by a reverse or regression analysis comparing initial market situations and a set of acceptable crossing results. The initial situations and the set of acceptable crossing results may be manually or algorithmically generated. Of course, more than one situation may be used in the initial or later re-generation or refinement of a crossing engine.

Variables that contribute to a description of an initial market situation include the number and potentially identity of market participants. Such participants may be fictional or may be selected from users whose trading history and/or portfolio of holdings are known to the system. The number of participants is one key variable that contributes to a situation's usefulness or accuracy as a training mechanism, but is ultimately limited by the computational power available to the system for generating and analyzing the set of trading outcomes resulting from the initial simulation.

Other variables that describe a training situation include any bid and/or offer prices and desired trading volumes for various products (i.e. "haves" and "wants"). As with the number of users, the number of products may also be limited to a selected training set. It is generally not important which products are chosen, except if specific constraints exist as to specific products and as long as the products that are chosen have sufficient associated data with which the system may interact. Products may be identified by their CUSIP and/or ISIN designations.

In addition to variables establishing the "landscape" of the training market situation and its participants, initial constraints may be enforced on individual trades, groups of trades or on users portfolios. As described below, such constraints may also be (or may alternatively be) applied or removed after an initial solution set or crossing engine are generated. For example, as an illustrative, specific example of constraints, a particular user may not be interested in selling less than X number of a particular bond in any one transaction, but also may not want to sell more than 50% of their overall holding of that bond. In this example, the first constraint (transaction size >X) is an example of a trade level constraint, while the second (keep 50% of current holding) is an example of a portfolio level constraint.

Other examples of constraints include constraints required by various internal or external rules or regulation. For example, a user may be required to have in their portfolio only corporate bonds issued by large cap industrial companies. In other examples, portfolio or trade level constraints may be the result of governmental regulation. For example, a user representing a pension fund may be required to keep the overall credit risk rating of their portfolio of fixed income securities above a certain threshold or may be limited to only making trades with other unaffiliated, arms-length market participants (restricted cross trading). In another example, a constraint may be that a user is restricted from buying and selling the same security.

In addition to constraints affecting the trades of one security, other constrains may also be implemented which affect the trades or holdings of more than one security. For example, a constraint may be implemented to ensure that no user's portfolio is more than 70% comprised of securities issued from a given country or region. Similarly, a constraint may be implemented to force the portfolio of a particular user to have an aggregate issuer credit rating above a certain predefined threshold.

For the purposes of explaining the concepts described herein, FIG. 2 provides a simplified example of a training situation that may be used to generate a set of acceptable trades for generating a crossing engine. Of course, it is to be understood that in practice, such initial situations may be much more complex than shown. In the example shown, users A, B and C each either hold (have) or are bidding for (want) the volume of securities X, Y and Z. For the purposes of simplification, FIG. 2 assumes that all volumes shown are at a price that would result in a cross. Of course, other implementations of the present systems may take into account situations in which bid and offer prices do not (or should not - with a properly trained crossing engine) result in a cross or in which bid and offer prices influence the allocation of trades between participants. Initially, each security is analyzed separately to produce a set of allowable cross graphs. The term "graph" is taken from the computer science concept of a "graph" data structure that is used by many social networks. In this instance, the nodes of the graph represent users and the edges of the graph are directionally weighted to represent the number of products that may be traded from a seller to a buyer.

For example, with the situation described in FIG. 2, an analysis is made of security X. A cross graph of permissible trades for security X (for which there are many discrete permissible solutions) is shown in FIG. 3. While user B wishes to buy 5 units of security X, users A and C are both able to sell up to 5 units of security X to user B. Accordingly, many possible permissible outcomes exist. The system is configured to explore at least one such possibility. In one example, a random number generator may be applied to the cross graph weights to arrive at one or more permissible final solutions. For example, as shown in FIG. 4, if the A to B edge weight is randomly set to 4, then the C to B edge weight must be 1 to ensure that B obtains their desired number of units of security X. Although the numbers are simplified in the example shown and it may seem trivial to run through all permissible final solutions, in larger simulations doing so may become computationally strenuous and not necessary to achieve a desired level of accuracy. In such cases, a subset of permissible edge weights may be selected and analyzed according to any suitable method, including assigning random weights to one or more edge weights, using a Monte Carlo simulation, etc.

In another example, the cross graph for security Y in the situation described by FIG. 2 yields only a single permissible result, shown in FIG. 6—that A sells 10 units of security Y to B.

In addition, cross graphs and permissible solutions to a given initial situation may be manually input for later analysis and inclusion in the crossing engine generation algorithms. These can be particularly useful to build into the crossing engine human knowledge gained as a result of past trading experiences and also to include in the engine knowledge of "corner" cases involving particularly difficult or rarely encountered trading situations that may not be fully described or fleshed out as a result of the aforementioned random sampling techniques.

Further, noise may be introduced in the system in the form of variances of any of the variables or constraints comprising the initial situation description in order to add to the number of cross graphs and permissible solutions available to the initial crossing engine generation process.

Figures 7, 8:
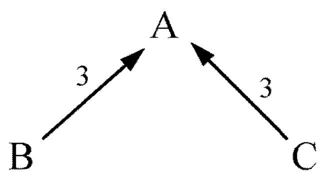
FIG. 7 shows yet another example of another cross graph according to an exemplary is embodiment.
FIG. 8 shows an example of a set of permissible trades in one exemplary embodiment.

Once a set of permissible solutions is calculated for a given situation for each security to be analyzed, those permissible solutions may be further filtered according to various constraints present or desired in the resulting crossing engine. For example, a constraint may be that no user is to sell more than 50% of their holdings of any one security. Taking the example of security Z shown in FIG. 2, for example, the initial analysis would result in the cross graph shown in FIG. 7 in which both B and C could sell up to 3 units of security Z to A. However, adding such a 50% retention constraint would limit the permissible outcomes to only the three shown in FIG. 8 in which B sells two or less units of security Z to A because B is not permitted to sell more than 2 of its 4 total units of security Z.

Once the final set of permissible solutions is obtained for the securities (which does not have to be exhaustive as randomization of edge weights or other sampling methods may be used to obtain a representative set of permissible outcomes, as described above), those outcomes are fed together with the initial situation description into a machine learning algorithm to generate an initial crossing engine.

The initial situation may then be applied to the initial crossing engine to obtain a set of recommended trades. From this point, reinforcement learning may be used to correct or further tune the crossing engine. If the creation of the initial crossing engine was successful, then in theory all recommended trades should fall within the set of permissible outcomes. However, if that is not the case, then the impermissible recommended trades may be identified and marked with a "penalty" or negative reinforcement. The crossing engine may then be re-generated, taking into account the negative reinforcement, and applied to the initial situation again to check for correctness.

After the generation of an initial crossing engine, additional constraints or optimizations may applied to further tune the crossing engine. For example, the recommended trades may be filtered according to any constraint and recommended trades violating a new constraint may be marked negatively and/or trades adhering to a new constraint may be marked positively and the crossing engine may be re-generated.

Similarly, a crossing engine may be tuned according to one or more optimization parameters. For example, even though a given situation may lend itself to more than one permissible trading solution, some trading solutions may be more desirable than others for some reason. Taking the exemplary set of permissible trades shown in FIG. 8, for example, one optimization parameter may be related to maximizing the number of users participating in trading. In this example, a positive reinforcement may be applied to solution numbers 2 and 3 since both B and C participate as sellers in those solutions, while in solution number 1, only C participates. Again, after application of the positive or negative reinforcements, the crossing engine may be re-generated.

It should be appreciated that re-generation of the crossing engine after the addition or removal of constraints or the addition or removal of reinforcements need not involve the regeneration of the initial situation descriptions. In this way, a substantial amount of computational work may be avoided. Of course, over time, new situations may be included in the set of situations used to generate crossing engines as circumstances dictate.

An Exemplary System i. Crossing Engine Generation System Controller

Figure 5:
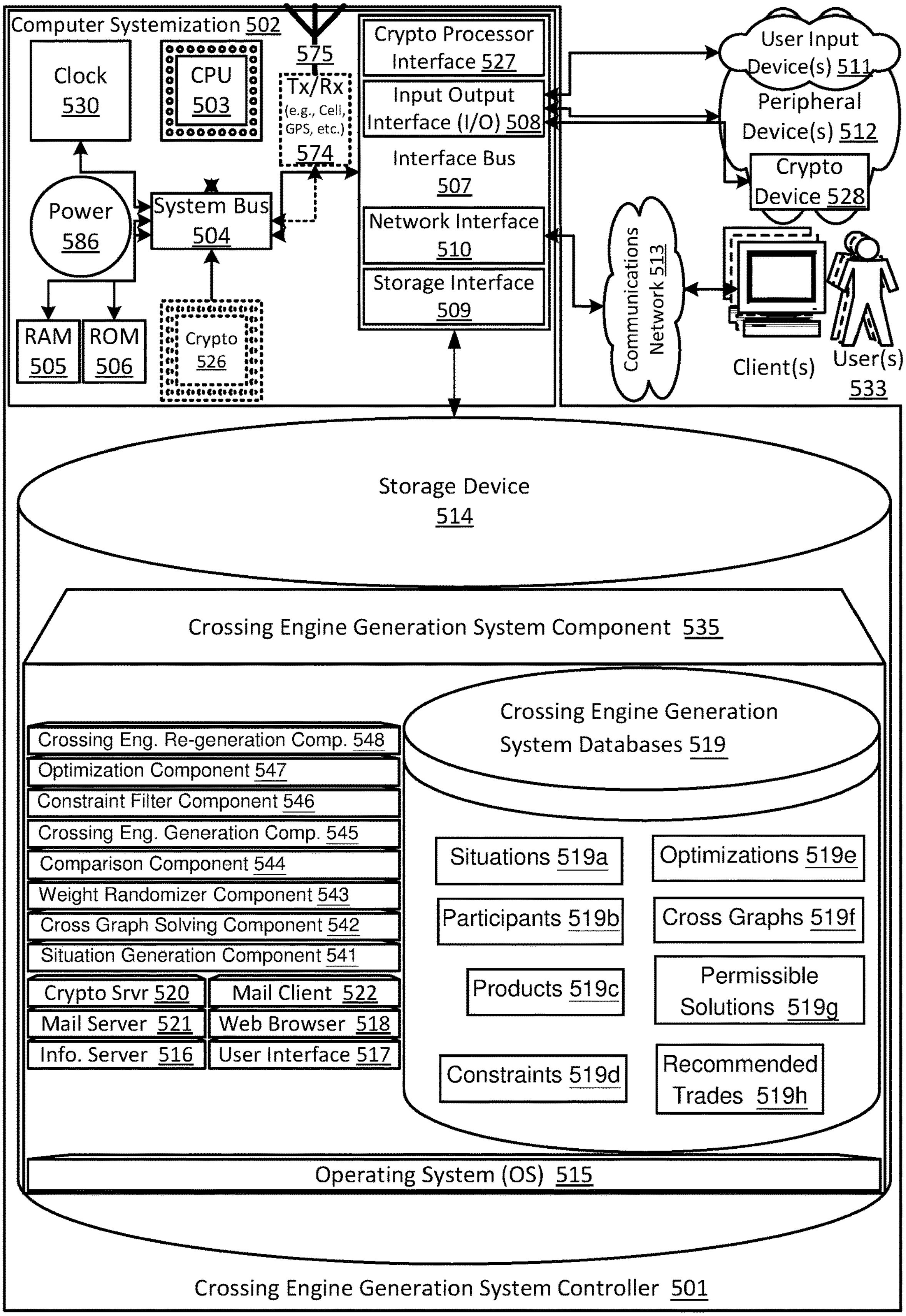
FIG. 5 shows a block diagram illustrating embodiments of a Crossing Engine Generation System controller.

FIG. 5 shows a block diagram illustrating embodiments of a Crossing Engine Generation System controller. In this embodiment, the Crossing Engine Generation System controller 501 may serve to aggregate, process, store, search, serve, identify, instruct, generate, match, and/or facilitate interactions with a computer, and/or other related data.

Typically, users, which may be people and/or other computerized systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Crossing Engine Generation System controller 501 may be connected to and/or communicate with entities such as, but not limited to: one or more users from user input devices 511; peripheral devices 512; an optional cryptographic processor device 528; and/or a communications network 513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Crossing Engine Generation System controller 501 may be based on computer systems that may comprise, but are not limited to, components such as: a computer systemization 502 connected to memory 529.

ii. Computer Systemization

A computer systemization 502 may comprise a clock 530, central processing unit ("CPU(s)" and/or "processor(s)" (these terms are used interchangeable throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effectuate communications, operations, storage, etc. The computer systemization may be connected to a power source 586; e.g., optionally the power source may be internal. Optionally, a cryptographic processor 526 and/or transceivers (e.g., ICs) 574 may be connected to the system bus. In another embodiment, the cryptographic processor and/or transceivers may be connected as either internal and/or external peripheral devices 512 via the interface bus I/O. In turn, the transceivers may be connected to antenna(s) 575, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing Crossing Engine Generation System controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the Crossing Engine Generation System controller and beyond through various interfaces. Should processing requirements dictate a greater amount speed and/or capacity, distributed processors (e.g., Distributed Crossing Engine Generation System), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the Crossing Engine Generation System may be achieved by implementing a microcontroller such as CAST's R8051XC2 microcontroller; Intel's MCS 51 (i.e., 8051 microcontroller); and/or the like. Also, to implement certain features of the Crossing Engine Generation System, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Crossing Engine Generation System component collection (distributed or otherwise) and/or features may be implemented via the microprocessor and/or via embedded components; e.g., via ASIC, coprocessor, DSP, FPGA, and/or the like. Alternately, some implementations of the Crossing Engine Generation System may be implemented with embedded components that are configured and used to achieve a variety of features or signal processing.

Depending on the particular implementation, the embedded components may include software solutions, hardware solutions, and/or some combination of both hardware/software solutions. For example, Crossing Engine Generation System features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Crossing Engine Generation System features. A hierarchy of programmable interconnects allow logic blocks to be interconnected as needed by the Crossing Engine Generation System designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the Crossing Engine Generation System may be developed on regular FPGAs and then migrated into a fixed version that more resembles ASIC implementations. Alternate or coordinating implementations may migrate Crossing Engine Generation System controller features to a final ASIC instead of or in addition to FPGAs. Depending on the implementation all of the aforementioned embedded components and microprocessors may be considered the "CPU" and/or "processor" for the Crossing Engine Generation System.

iii. Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the Crossing Engine Generation System thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

iv. Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the Crossing Engine Generation System controller is accessible through remote clients 533*b* (e.g., computers with web browsers) by users 533*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed Crossing Engine Generation System), architectures may similarly be employed to pool, load balance, and/or otherwise increase the communicative bandwidth required by the Crossing Engine Generation System controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 512 may be connected and/or communicate to I/O and/or other facilities of the like such as network interfaces, storage interfaces, directly to the interface bus, system bus, the CPU, and/or the like. Peripheral devices may be external, internal and/or part of the Crossing Engine Generation System controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the Crossing Engine Generation System controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the Crossing Engine Generation System controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

v. Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the Crossing Engine Generation System controller and/or a computer systemization may employ various forms of memory 529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

vi. Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the Crossing Engine Generation System component(s) 535; the Situation Generation component 541; the Cross Graph Solving component 542, the Weight Randomizer component 543; the Comparison component 544; the Crossing Engine Generation component 545; the Constraint Filtering component 546; the Optimization component 547; the Crossing Engine Re-Generation component 548 and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like. Also, while the components are described separately herein, it will be understood that they may be combined and/or subdivided in any compatible manner.

vii. Operating System

The operating system component 515 is an executable program component facilitating the operation of the Crossing Engine Generation System controller. Typically, the operating system facilitates access of 1/0, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeB SD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 10/8/7/2003/2000/98/95/3.1/CE/Millenium/NTNista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Crossing Engine Generation System controller to communicate with other entities through a communications network 513. Various communication protocols may be used by the Crossing Engine Generation System controller as a subcarrier transport mechanism for interaction, such as, but not limited to: multicast, TCP/IP, UDP, unicast, and/or the like.

viii. Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF' s) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Crossing Engine Generation System controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Crossing Engine Generation System databases 519, operating systems, other program components, user interfaces, Web browsers, and/or the like.

Access to the Crossing Engine Generation System database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Crossing Engine Generation System. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Crossing Engine Generation System as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

ix. User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

x. Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the Crossing Engine Generation System enabled nodes. The combined application may be nugatory on systems employing standard Web browsers.

xi. Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Crossing Engine Generation System. Mail may also take the form of messages sent from one Crossing Engine Generation System user to another that is not in the form of traditional email but is more akin to direct messaging or the like conventionally enabled by social networks.

Access to the Crossing Engine Generation System mail may be achieved through a number of APIs offered by the individual Web server components and/or the operating system.

Also, a mail server may contain, communicate, generate, obtain, and/or provide program component, system, user, and/or data communications, requests, information, and/or responses.

xii. Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

xiii. Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MDS, which is a one way hash operation), passwords, Rivest Cipher (RCS), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Crossing Engine Generation System may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the Crossing Engine Generation System component to engage in secure transactions if so desired. The cryptographic component facilitates the secure accessing of resources on the Crossing Engine Generation System and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

xiv. The Crossing Engine Generation System Databases

The Crossing Engine Generation System databases component 519 may be embodied in one database and its stored data, may be embodied in two or more distinct databases and their stored data, or may be partially or wholly embodied in an unstructured manner. For the purposes of simplicity of description, discussion of the Crossing Engine Generation System databases component 519 herein may refer to such component in the singular tense, however this is not to be considered as limiting the Crossing Engine Generation System databases to an embodiment in which they reside in a single database. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Crossing Engine Generation System database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the Crossing Engine Generation System database is implemented as a data-structure, the use of the Crossing Engine Generation System database 519 may be integrated into another component such as the Crossing Engine Generation System component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 may include several included databases or tables 519*a-h*, examples of which are described above. For example, the database component may include situation database 519*a*, a participant database 519*b*, a product database 519*c*, a constraint database 519*d*, an optimization database 519*e*, a cross graph database, a permissible solutions database, and a recommended trades database 519*h*.

In one embodiment, the Crossing Engine Generation System database 519 may interact with other database systems. For example, employing a distributed database system, queries and data access by a search Crossing Engine Generation System component may treat the combination of the Crossing Engine Generation System databases 519, an integrated data security layer database as a single database entity.

In one embodiment, user programs may contain various user interface primitives, which may serve to update the Crossing Engine Generation System. Also, various accounts may require custom database tables depending upon the environments and the types of clients the Crossing Engine Generation System may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519*a-f*. The Crossing Engine Generation System may be configured to keep track of various settings, inputs, and parameters via database controllers.

The Crossing Engine Generation System database may communicate to and/or with other components in a component collection, including itself, and/or facilities of the like. Most frequently, the Crossing Engine Generation System database communicates with the Crossing Engine Generation System component, other program components, and/or the like. The database may contain, retain, and provide information regarding other nodes and data.

xv. The Crossing Engine Generation Systems

The Crossing Engine Generation System component 535 is a stored program component that is executed by a CPU. In one embodiment, the Crossing Engine Generation System component incorporates any and/or all combinations of the aspects of the Crossing Engine Generation System that was discussed in the previous figures. As such, the Crossing Engine Generation System affects accessing, obtaining and the provision of information, services, transactions, and/or the like across various communications networks. The features and embodiments of the Crossing Engine Generation System discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the Crossing Engine Generation System's features and facilities, and in many cases reduce the costs, energy consumption/requirements, and extend the life of Crossing Engine Generation System's underlying infrastructure; this has the added benefit of making the Crossing Engine Generation System more reliable. Similarly, many of the features and mechanisms are designed to be easier for users to use and access, thereby broadening the audience that may enjoy/employ and exploit the feature sets of the Crossing Engine Generation System; such ease of use also helps to increase the reliability of the Crossing Engine Generation System. In addition, the feature sets include heightened security as noted via the Cryptographic components 520, 526, 528 and throughout, making access to the features and data more reliable and secure.

The Crossing Engine Generation System component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Crossing Engine Generation System server employs a cryptographic server to encrypt and decrypt communications. The Crossing Engine Generation System component may communicate to and/or with other components in a component collection, including itself, and/or facilities of the like. Most frequently, the Crossing Engine Generation System component communicates with the Crossing Engine Generation System database, operating systems, other program components, and/or the like. The Crossing Engine Generation System may contain, communicate, generate, obtain, and/or provide program component, system, user, and/or data communications, requests, and/or responses.

xvi. Distributed Crossing Engine Generation Systems

The structure and/or operation of any of the Crossing Engine Generation System node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Crossing Engine Generation System controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the Crossing Engine Generation System controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
   $input = "";
   $input = socket_read($client, 1024);
   $data . = $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

| |
|---|
| http://www.xav.com/perl/site/lib/SOAP/Parser.html |
| http://publib.boulder.ibm.com/infocenter/tivihelp/v2r1/index.jsp?topic=/com.ibm.IBMDI.doc/referenceguide295.htm |

and other parser implementations:

| |
|---|
| http://publib.boulder.ibm.com/infocenter/tivihelp/v2r1/index.jsp?topic=/com.ibm.IBMDI.doc/referenceguide259.htm |

all of which are hereby expressly incorporated by reference.

Conclusion

FIGS. 1 through 8 are conceptual illustrations allowing for an explanation of the present disclosure. It should be understood that various aspects of the embodiments of the present disclosure could be implemented in hardware, firmware, software, or combinations thereof In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

In order to address various issues and advance the art, the entirety of this application for METHODS, SYSTEMS AND APPARATUSES FOR CREATING, TRAINING AND RECONFIGURING A CROSSING ENGINE FOR FINANCIAL TRADING (including the Cover Page, Title, Headings, Cross-Reference to Related Application, Background, Brief Summary, Brief Description of the Drawings, Detailed Description, Claims, Figures, Abstract and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments may be implemented that enable a great deal of flexibility and customization. For example, aspects may be adapted for video, audio or any other content. While various embodiments and discussions have included reference to applications in the legal industry, it is to be understood that the embodiments described herein may be readily configured and/or customized for a wide variety of other applications and/or implementations.

What is claimed is:

1. A computer implemented method for generating a trained crossing engine, embodied as instructions stored in non-transitory computer memory which, when executed by a computer processor, are configured to:

receive an initial situation specifying at least a variable set associated with a plurality of market participants, wherein each market participant is associated with at least one product that the market participant has or wants;

generate, by a crossing engine generation component executed by the computer processor, a cross graph for each product to produce a plurality of cross graphs, each cross graph specifying a volume of the product available to sell to those market participants wanting the product by those market participants having the product and store the plurality of cross graphs in a cross graph database;

generate, by a cross graph solving component executed by the computer processor, based at least in part on the plurality of cross graphs stored in the cross graph database, a set of permissible solutions, each permissible solution of the set of permissible solutions specifying an exact volume of product that may be either bought or sold by each market participant and store the set of permissible solutions in a permissible solutions database;

generate, by a crossing engine generation component executed by the computer processor, based at least in part on (i) the variable set associated with the initial situation and (ii) the set of permissible solutions stored in the permissible solutions database, an initial crossing engine, the initial crossing engine comprising a trained machine learning algorithm for a deep learning task;

provide the initial situation to the initial crossing engine;

receive, as output from the initial crossing engine and based on the initial situation, a set of recommended trades and store the set of recommended trades in a recommended trades database;

generate a reinforced set of recommended trades by marking selected recommended trades from the set of recommended trades output by the initial crossing engine with positive or negative reinforcements;

verify that the set of recommended trades output by the initial crossing engine falls within the set of permissible solutions stored in the permissible solutions database, identify in the set of recommended trades output by the initial crossing engine any impermissible recommended trades that do not fall within the set of permissible solutions, and mark the impermissible recommended trades with a negative reinforcement in the reinforced set of recommended trades;

filter the set of recommended trades output by the initial crossing engine according to a new constraint, mark any recommended trades, from the set of recommended trades output by the initial crossing engine, that violate the new constraint with a negative reinforcement in the reinforced set of recommended trades, and mark any recommended trades, from the set of recommended trades output by the initial crossing engine, that adhere to the new constraint with a positive reinforcement in the reinforced set of recommended trades;

mark selected recommended trades of the set of recommended trades output by the initial crossing engine with a positive reinforcement or a negative reinforcement in the reinforced set of recommended trades in accordance with an optimization specification;

regenerate, via two or more iterations of reinforcement machine learning over time, the initial crossing engine based on the reinforced set of recommended trades and the initial situation by removing one or more of constraints of the set of recommended trades during the two or more iterations of the reinforcement learning to obtain a first revised crossing engine that is tuned according to one or more first optimization parameters related to a set of reinforcement learning rules for the positive reinforcement or the negative reinforcement in the reinforced set of recommended trades, the first revised crossing engine comprising a retrained machine learning algorithm to improve the deep learning task for the retrained machine learning algorithm as compared to the trained machine learning algorithm for the initial crossing engine, wherein the two or more iterations of the reinforcement machine learning is executed without regeneration of the variable set associated with the initial situation to minimize computational resources for the computer processor;

receive a new situation specifying a market participant of the plurality of market participants, wherein the market participant is associated with at least one product that the market participant has or wants;

apply the new situation to the retrained machine learning algorithm of the first revised crossing engine to generate a new set of recommended trades for the market participant;

verify that the new set of recommended trades satisfy the set of permissible solutions in the permissible solutions database; and based on a determination that one or more new recommended trades of the new set of recommended trades do not satisfy the set of permissible solutions in a permissible solutions database, regenerate the first revised crossing engine to generate a second revised crossing engine that is tuned according to one or more second optimization parameters related to the set of reinforcement learning rules.

2. The method of claim 1, wherein the initial situation specifies at least one trade constraint.

3. The method of claim 1, wherein the initial situation specifies at least one portfolio constraint.

4. The method of claim 1, wherein the instructions stored in non- transitory computer memory, when executed by a computer processor, are further configured to:

apply a constraint to the set of recommended trades to produce a constrained set of recommended trades; and regenerate the initial crossing engine based on the constrained set of recommended trades and the initial situation.

5. The method of claim 1, wherein the instructions stored in non- transitory computer memory, when executed by a computer processor, are further configured to:

remove a constraint on the set of recommended trades to produce a less constrained set of recommended trades; and regenerate the initial crossing engine based on the less constrained set of recommended trades and the initial situation.

6. The method of claim 1, wherein a cross graph comprises one or more nodes and one or more edges.

7. The method of claim 6, wherein a node represents a market participant.

8. The method of claim 6, wherein an edge connects a first market participant and a second market participant.

9. The method of claim 6, wherein an edge represents a number of products that may be traded from a first market participant to a second market participant.

10. The method of claim 8, wherein an edge comprises an edge weight.

11. The method of claim 10, wherein an edge weight is assigned based on output from a random number generator.

12. The method of claim 1, wherein a product comprises a security.

13. The method of claim 12, wherein a product is identified by one of a CUSIP designation or a ISIN designation.

14. The method of claim 1, wherein the instructions stored in non-transitory computer memory, when executed by a computer processor, are further configured to:

deliver the set of recommended trades for rendering via a user interface.

15. A computer implemented method for generating a trained crossing engine, embodied as instructions stored in non-transitory computer memory which, when executed by a computer processor, are configured to:

receive an initial situation specifying at least a variable set associated with a plurality of market participants, wherein each market participant is associated with at least one product that the market participant has or wants;

generate, by a crossing engine generation component executed by the computer processor, a cross graph for each product to produce a plurality of cross graphs, each cross graph specifying a volume of the product available to sell to those market participants wanting the product by those market participants having the product and store the plurality of cross graphs in a cross graph database;

generate, by a cross graph solving component executed by the computer processor, based at least in part on the plurality of cross graphs stored in the cross graph database, a subset of permissible solutions, each permissible solution specifying an exact volume of product that may be either bought or sold by each market participant and store the subset of permissible solutions in a permissible solutions database;

generate, by a crossing engine generation component executed by the computer processor, based at least in part on (i) the variable set associated with the initial situation and (ii) the subset of permissible solutions stored in the permissible solutions database, an initial crossing engine, the initial crossing engine comprising a trained machine learning algorithm for a deep learning task;

provide the initial situation to the initial crossing engine;

receive, as output from the initial crossing engine and based on the initial situation, a set of recommended trades and store the set of recommended trades in a recommended trades database;

generate a reinforced set of recommended trades by marking selected recommended trades from the set of recommended trades output by the initial crossing engine with positive or negative reinforcements;

verify that the set of recommended trades output by the initial crossing engine falls within the subset of permissible solutions stored in the permissible solutions database, identify in the set of recommended trades output by the initial crossing engine any impermissible recommended trades that do not fall within the set of permissible solutions, and mark the impermissible recommended trades with a negative reinforcement in the reinforced set of recommended trades;

filter the set of recommended trades output by the initial crossing engine according to a new constraint, mark any recommended trades, from the set of recommended trades output by the initial crossing engine, that violate the new constraint with a negative reinforcement in the reinforced set of recommended trades, and mark any recommended trades, from the set of recommended trades output by the initial crossing engine, that adhere to the new constraint with a positive reinforcement in the reinforced set of recommended trades;

mark selected recommended trades of the set of recommended trades output by the initial crossing engine with a positive reinforcement or a negative reinforcement in the reinforced set of recommended trades in accordance with an optimization specification;

regenerate, via two or more iterations of reinforcement machine learning over time, the initial crossing engine based on the reinforced set of recommended trades and the initial situation by removing one or more of constraints of the set of recommended trades during the two or more iterations of the reinforcement learning to obtain a first revised crossing engine that is tuned according to one or more first optimization parameters related to a set of reinforcement learning rules for the positive reinforcement or the negative reinforcement in the reinforced set of recommended trades, the first revised crossing engine comprising a retrained machine learning algorithm to improve the deep learning task for the retrained machine learning algorithm as compared to the trained machine learning algorithm for the initial crossing engine, wherein the two or more iterations of the reinforcement machine learning is executed without regeneration of the variable set associated with the initial situation to minimize computational resources for the computer processor;

receive a new situation specifying a market participant of the plurality of market participants, wherein the market participant is associated with at least one product that the market participant has or wants;

apply the new situation to the retrained machine learning algorithm of the first revised crossing engine to generate a new set of recommended trades for the market participant;

verify that the new set of recommended trades satisfy the set of permissible solutions in the permissible solutions database; and based on a determination that one or more new recommended trades of the new set of recommended trades do not satisfy the set of permissible solutions in a permissible solutions database, regenerate the first revised crossing engine to generate a second revised crossing engine that is tuned according to one or more second optimization parameters related to the set of reinforcement learning rules.

16. The method of claim 1, further comprising algorithmically generating the initial situation.

17. The method of claim 1, wherein the subset of permissible solutions is algorithmically generated by the cross graph solving component executed by the computer processor.

18. The method of claim 15, further comprising inputting into the permissible solutions database a permissible solution that was not generated by the cross graph solving component.

19. The method of claim 15, wherein the subset of permissible solutions is not exhaustive of all permissible solutions.

20. The method of claim 15, wherein the exact volume of product that may be either bought or sold by each market participant for each permissible solution in the subset of permissible solutions is generated by a random number generator.

* * * * *